United States Patent [19]
Korenkov et al.

[11] 3,943,055
[45] Mar. 9, 1976

[54] PROCESS FOR PURIFICATION OF INDUSTRIAL WASTE WATERS FROM PERCHLORATES AND CHLORATES

[76] Inventors: Vladimir Nikolaevich Korenkov, Samarkandsky bulvar, 32, korpus 1, kv. 51, Moscow; Vitaly Ivanovich Romanenko, Nekouzsky raion, p/o Borok, 36, kv. 21, Yaroslavskaya oblast; Sergei Ivanovich Kuznetsov, Volkhovsky pereulok, 21, kv. 1; Jury Viktorovich Voronov, Yaroslavskoe shosse, 4, korpus 3, kv. 229, both of Moscow, all of U.S.S.R.

[22] Filed: July 3, 1974

[21] Appl. No.: 485,371

[52] U.S. Cl. .................................................. 210/2
[51] Int. Cl.² ........................................ C02C 5/10
[58] Field of Search ................ 195/2; 210/2, 11, 16

[56] References Cited
UNITED STATES PATENTS

| | | | |
|---|---|---|---|
| 3,105,014 | 9/1963 | Harrison | 210/2 X |
| 3,634,226 | 1/1972 | Witt et al. | 195/2 X |
| 3,756,947 | 9/1973 | Fujii et al. | 210/11 |

Primary Examiner—Thomas G. Wyse
Attorney, Agent, or Firm—Steinberg & Blake

[57] ABSTRACT

The process of the present invention involves intermixing of industrial waste waters with household-communal waste waters with subsequent biochemical reduction of perchlorates and chlorates contained in said waters under anaerobic conditions by means of a strain of the microorganism *Vibrio dechloraticans Cuznesove* B-1168 grown by way of successive inoculations on a liquid nutrient medium containing sources of carbon, nitrogen, and phosphorus under anaerobic conditions in the presence of a perchlorate as a donor of oxygen; said strain having the following morphological characteristics and physiological properties: single cells, size $0.8-1 \times 0.5-0.4\mu$ mobile with one flagella of $1.5-2\mu$, bent-vibrio, sporeless, well-coloured with fuchsione and non-coloured with methylene blue, gram-negative; grows only on a liquid nutrient medium; does not grow on a meat-pentone agar or agarized medium; can be grown on an acetate under anaerobic conditions in the presence of a perchlorate; well-grown on ethanol with reduction of a perchlorate; lactose, starch, and salts of oxalic and citric acids cannot be used for reduction of perchlorates; glucose and sugars may be used but with diffuclties and only in the presence of a small amount of an acetate; reduces perchlorates and chlorates without dissolved gaseous oxygen in the presence of readily-oxidized organic substances; in minor amounts is capable of assimilating carbonic acid in proportion to the biomass growth; in small amounts capable of reducing nitrates to nitrites, i.e. an enzyme such as nitratereductase is present in cells; reduces perchlorates to chlorides at a rate of 5 g of a perchlorate for 3 days per 1 g of the biomass solids and may grow at a concentration of ammonium perchlorate of about 300 mg/l.

3 Claims, No Drawings

PROCESS FOR PURIFICATION OF INDUSTRIAL WASTE WATERS FROM PERCHLORATES AND CHLORATES

The present invention relates to purification processes and, more specifically, to a process for purifying industrial waste waters from chlorates and perchlorates which may be useful in chemical industry.

Waste waters from chemical plants are toxic and cannot be drained into reservoirs without being preliminarily purified.

Known in the art is a process for purifying mine waste waters containing combined oxygen in the form of sulphates by means of microorganisms. Removal of $SO_4^{2-}$ is effected by means of sulphate-reducing bacteria *Desulfovibrio desulfuricans*, reduction, under anaerobic conditions, to hydrogen sulphide which reacts with iron and precipitates as iron sulphide. As the source of carbon and energy for these bacteria use is made of chips decomposition products resulting from the vital activity of heterotrophic microflora. (Cf. Tuttle J. H., Dygan P. R. at al., 1969, "Microbal Dissimilatory Sulfur Cycle in Acid Mine Water," J. Bacteriol, 97, No. 2, 549).

Bacteria *Desulfovibrio desulfuricans* cannot reduce perchlorates and chlorates, whereby purification of industrial waste waters containing perchlorates and chlorates is impossible to perform by means of these bacteria.

Also known in the art is a process of a biochemical purification of industrial waste waters containing combined oxygen in the form of inorganic compounds of hexavalent chromium, chlorine and a mixture thereof, which process comprises intermixing said industrial waste waters with household-communal waters containing organic substances, biochemical reduction of the oxygen-containing inorganic chromium and chlorine compounds under anaerobic conditions by means of an active silt with a simultaneous oxidation of organic substances of the household-communal waters (U.S. Pat. No. 3,755,156).

This prior art process has a disadvantage residing in a low rate of reducing perchlorates and chlorates with an active silt (5.1 to 5.9 mg per 1 g of active silt (based on the solids per hour).

It is an object of the present invention to increase the rate of reducing perchlorates and chlorates in industrial waste waters.

This object is accomplished by means of a process of purification of industrial waste waters from perchlorates and chlorates by way of intermixing industrial waste waters with household-communal waste waters, biochemical reduction of the perchlorates and chlorates under anaerobic conditions, followed by separation of purified waters, in accordance with the present invention, the biochemical reduction of perchlorates and chlorates is effected by means of a strain of the microorganism *Vibrio dechloraticans Cuznesove* B-1168 produced by way of successive inoculations on a liquid nutrient medium containing sources of carbon, nitrogen, and phosphorus under anaerobic conditions in the presence of a perchlorate as a donor of oxygen and having the following morphological features and physiological properties: single cells of a 0.8–1 by 0.5–0.4 $\mu$ size; mobile with one flagella of 1.5–2 $\mu$; bent — vibrio; sporeless; well-colourable with fuchsione and non-colourable with methylene blue; gram-negative; grow only on a liquid nutrient medium; do not grow on a meat-pentone agar and on an agarized medium; may grow on an acetate under anaerobic conditions in the presence of a perchlorate; well-grown on ethanol with reduction of a perchlorate; not used for reduction of perchlorates are lactose, starch, salts of oxalic and citric acids; glucose and surgars may be used but with substantial difficulties and only in the presence of a small amount of acetate; reduce perchlorates and chlorates without dissolved gaseous oxygen and in the presence of readily-oxidizable organic substances; capable of assimilating, when in minor amounts, carbonic acid proportional to the biomass increase; capable of reducing, when in minor amounts, nitrates to nitrites, i.e. enzyme nitratereductase is present in cells; reduce perchlorates to chlorides at a rate of 5 g of a perchlorate for 3 days per 1 g of a dry substance of the biomass and may grow at a concentration of ammonium perchlorate of about 300 mg/l.

The strain *Vibrio dechloraticans Cuznesove* B-1168 is deposited in the Institute of Microbiology of the USSR Academy of Sciences.

It is preferred that the strain *Vibrio dechloraticans Cuznesove* B-1168 be introduced into a mixture of industrial and household-communal waste waters in an amount of 3 to 7 g/l calculated on the biomass dry substance, and the process be conducted by maintaining said microorganism in the state of a suspension.

The process according to the present invention is embodied in the following manner.

Industrial waters containing ammonium perchlorate are fed into a receiving homogenizer, wherein they are homogenized with respect to ammonium perchlorate concentration and then continously discharged into a closed tank (bio-reducer). Household-communal waters are fed into a settling vessel to remove coarse suspended particles by settling, wherefrom the resulting clarified waters are continuously delivered into said closed tank (bio-reducer). The amount of industrial and household-communal waste waters fed into the bio-reducer is adjusted so that the amount of readily oxidized organic substances with respect to BRO (biochemically required oxygen) introduced with household-communal waters is greater than the amount of combined oxygen in ammonium perchlorate introduced with industrial waters by at least 1.2 times. The closed tank (bio-reducer) volume is defined by the time required for biological reduction of ammonium perchlorate. The culture *Vibrio dechloraticans Cuznesove* B-1168 is continuously fed into the closed tank from the settling vessel at a rate ensuring a concentration of the enriched culture in the bio-reducer within the range of from 3 to 7 g/l based on the solids of the biomass. The mixture of industrial, communal-household waste waters and the culture *Vibrio dechloraticans Cuznesove* B-1168 is continuously stirred in the atmosphere free from air oxygen and then continuously delivered to a settling apparatus, wherein the culture *Vibrio dechloraticans Cuznesove* B-1168 is settled, while clarified water purified from perchlorates and chlorates is drained. The culture *Vibrio dechloraticans Cuznesove* B-1168 is continuously pumped in a required amount into the bio-reducer.

The use of the culture Vibrio dechloraticans Cuznesove B-1168 makes it possible to intensify the process of purification of waste waters from perchlorates and chlorates due to an increase in the speed of reduction of perchlorates and chlorates by 5–10 times as compared to the prior art process, whereby the purification time and volume of the process apparatus are substantially reduced.

The process of biochemical reduction of perchlorates and chlorates by means of microorganisms *Vibrio dechloraticans Cuznesove* B-1168 proceeds rather rapidly and completely with the amount of readily-oxidized organic substances characterized by the BRO (biochemically required oxygen) exceeding the amount of combined oxygen of perchlorates and chlorates in the mixture by at least 1.2 times. The rate of reduction of perchlorates and chlorates is as high as up to 70 mg/g of the biomass solids per hour.

For better understanding of the present invention the following specific Examples illustrating the process for the purification of industrial waste waters from perchlorates and chlorates are given hereinbelow.

EXAMPLE 1

Industrial waste waters containing ammonium perchlorate are fed into a receiving homogenizer and continuously pumped therefrom into a bio-reducer at the rate of 200 l/hr and at the ammonium perchlorate concentration of 600 mg/l.

Household-communal waters are fed into a settling vessel wherein they are settled, and the clarified waters with the BRO value (biochemically required oxygen) of 180 mg/l are pumped into the bio-reducer at the rate of 1 m$^3$/hr. The concentration of ammonium perchlorate in the mixture of industrial and household-communal waste waters is 100 mg/l at the BRO (biochemically required oxygen) value of 150 mg/l. The enriched culture *Vibrio dechloraticans Cuznesove* B-1168 is continuously pumped into the bio-reducer. The concentration of said culture in the bio-reducer is 3.5 g/l based on the biomass solids. The residence time of the mixture of industrial, household-communal waste waters and said culture *Vibrio dechloricans Cuznesove* B-1168 in the bio-reducer under continuous stirring by means of mechanical agitators without access of oxygen is 1 hour (the bio-reducer volume is 1.2 m$^3$). During this time the perchlorate-ion is completely reduced to chlorides. The mixture of waters and culture from the bio-reducer is continuously discharged by gravity into a settling apparatus, wherein said culture is separated and settled, while the water purified from perchlorates is drained. The rate of reduction of perchlorate is 28 mg/g of the biomass solids per hour.

EXAMPLE 2

A closed vessel is charged with 1 l. of a medium with the composition as follows: $K_2HPO_4$ 100 mg/l; $MgSO_4$ 10 mg/l NaCl 20 mg/l, $NH_4Cl$ 50 mg/l, microelements according to Hagedorn, Vitamin $B_{12}$ 50 mcg, $CH_3COONa$ 500 mg prepared using tap water, ammonium perchlorate 200 mg, and potassium chlorate 100 mg as well as 3 g of the pure culture *Vibrio dechloraticans Cuznesove* B-1168. The vessel contents is maintained without access of oxygen (under anaerobic conditions) under continuous stirring by means of a mechanical agitator for 70 minutes. Thereafter, the stirring is discontinued, the culture *Vibrio dechloraticans Cuznesove* B-1168 is settled in the vessel, and the water purified from ammonium perchlorate and potassium chlorate is drained by means of a siphon. During the operation, concentration of ammonium perchlorate (with respect to ion $ClO_4^-$) and potassium chlorate (with respect to ion $ClO_3^-$) is reduced to zero. Rate of reduction of ammonium perchlorate and potassium chlorate is 5 g/g of the biomass solids for three days or 70 mg/g of the biomass solids per hour.

What is claimed is:

1. A process for the purification of industrial waste waters containing perchlorates and chlorates which comprises contacting such waste waters under anaerobic conditions with a strain of the microorganism *Vibrio dechloraticans Cuznesove* B-1168, and maintaining said waste waters in contact with said microorganism under anaerobic conditions until said perchlorates and chlorates in said waste waters have been reduced.

2. A process as claimed in claim 1, wherein the strain *Vibrio dechloraticans Cuznesove* B-1168 is introduced into a mixture of industrial and household-communal waste waters containing perchlorates and chlorates in an amount of from 3 to 7 g/l calculated on the biomass solids and the process is conducted by maintaining said microorganism in a suspended condition.

3. Method according to claim 1 wherein said microorganism is separated from the thus purified waste waters.

* * * * *